US007783659B2

(12) United States Patent
Akkiraju et al.

(10) Patent No.: US 7,783,659 B2
(45) Date of Patent: Aug. 24, 2010

(54) METHOD AND SYSTEM FOR ASSESSING AND REFINING THE QUALITY OF WEB SERVICES DEFINITIONS

(75) Inventors: Rama Kalyani Tirumala Akkiraju, Yorktown Heights, NY (US); Anca Andreea Ivan, White Plains, NY (US); Richard Thomas Goodwin, Dobbs Ferry, NY (US); HuaFang Tan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 11/672,421

(22) Filed: Feb. 7, 2007

(65) Prior Publication Data

US 2008/0189278 A1    Aug. 7, 2008

(51) Int. Cl.
*G06F 7/00* (2006.01)
(52) U.S. Cl. .......................... 707/766; 706/11; 706/12; 706/13; 706/14; 715/200; 715/277
(58) Field of Classification Search .................. 707/5, 707/766; 706/11–14; 715/200, 277
See application file for complete search history.

(56) References Cited

U.S. PATENT DOCUMENTS

| 7,137,071 | B2 | 11/2006 | Fuller et al. | |
| 2003/0217044 | A1* | 11/2003 | Zhang et al. | 707/3 |
| 2005/0125773 | A1 | 6/2005 | Hawley et al. | |
| 2006/0136428 | A1* | 6/2006 | Syeda-Mahmood | 707/100 |
| 2006/0253476 | A1 | 11/2006 | Roth et al. | |

OTHER PUBLICATIONS

Akkiraju et al., Web Service Semantics- WSDL-S, Apr. 18, 2005, 42 pages.*
Dong. X. et al... "Using Categorization to Further Enhance the Utilization of Semantic Web in UDDI" Jun. 2006, First International Multi-Symposiums on Computer and Computational Sciences, p. 5, vol. 2 (IMSCCS 2006). (Abstract).
Jiang, J. et al... UML Based-Modeling and Validity Checking of Web Service Descriptions Jul. 2005, Proceedings 2005 IEEE International Conference on Web Service, pp. 453-460. (Abstract).

(Continued)

*Primary Examiner*—John R Cottingham
*Assistant Examiner*—Noosha Arjomandi
(74) *Attorney, Agent, or Firm*—McGinn IP Law Group PLLC; Kenneth R. Corsello, Esq.

(57) ABSTRACT

A system and method of assessing and refining quality of Web services (WSDL) definitions for enabling automatic discovery and matching thereof, which includes normalizing definition elements and identifying at least one element as being at least one of cryptic, ambiguous, and unclear to provide a normalization output, assessing a quality of the at least one definition element based on the normalization output, classifying the identified at least one definition element into at least one predetermined category, and providing a quality assessment output, and automatically generating a recommendation for changing at least one definition element based on at least one of the normalization output and the quality assessment output, thereby enabling automatic discovery and matching thereof.

17 Claims, 5 Drawing Sheets

OTHER PUBLICATIONS

Wu, J. et al... "Similarity Based Web Service Matchmaking" Jul. 2005, 2005 IEEE International Conference of Services Computing, vol. 1 pp. 287-294. (Abstract).

Zhang, T. et al... "Carrying on Automatic Service Recomendation by Agents" May 2005, Computer Supported Cooperative Work in Design II 9th International Conference (CSCWD) 2005, Computer Science vol. 3865 pp. 254-263. (Abstract).

Hironori Washizaki, et al... "A Metrics Suite for Measuring Reusability of Software Components" Proceedings of the Ninth International Software Metrics Symposium (Metrics'03) 2003.

Margaretha W. Price, et al... "Analyzing and Measuring Reusability in Object-Oriented Designs" 1997 ACM 0-89791-908-4/97/0010.

Workshop Program of the 10th International Workshop on Software Measurement in Berlin, Germany, Oct. 4-6, 2000.

\* cited by examiner

METHOD AND SYSTEM FOR ASSESSING AND REFINING THE QUALITY OF WEB SERVICES DEFINITIONS

BACKGROUND OF THE INVENTION

1. Field of the Invention

The present invention generally relates to a method and system for assessing and refining quality of Web services definitions (i.e., Web Services Definition Language (WSDL) definitions) for enabling automatic discovery and matching thereof, and more particularly, to a method and system for assessing the description of Web services definitions and refining or improving WSDL definitions by providing automated one or more recommendations or suggestions for making Web services descriptions more amenable for consumption by automatic matching and composition engines.

2. Description of the Conventional Art

Companies are rapidly adopting Web services definitions (represented as Web Service Description Language (i.e., WSDL)) as the standard way of representing their business applications. Integrating business applications written as Web services is an important challenge faced by organizations today. This is a difficult problem because the interface descriptions of Web services are often terse and cryptic, especially when the services are generated by wrapping legacy code. Poorly written Web services interface definitions often pose many hurdles to automation tools.

As mentioned above, business process integration is among the most important challenges faced by organizations today. Integrating disparate business applications is at the heart of this challenge. In the context of a large enterprise that was created through mergers and acquisitions, there are often thousands of applications and data repositories, each with associated services and interface definitions. Since these interfaces were created for different organizations, over different periods of time and for different initial purposes, it is unlikely that they use a common set of terms to name services and parameters. This leads to substantial heterogeneity in syntax, structure and semantics.

For example, what one service interface in one system may encode as itemID, dueDate, and quantity may be referred to by another service interface in a different application as UPC (Universal Part Code), itemDeliveryTime and numItems.

Other examples include using cryptic names such as CDE to refer to 'code' without providing any abbreviation expansions or using multi-part words such as 'STRTDT' to refer to 'START_DATE' without any word separation characters could confuse an automatic interface mapping engines thereby leading to incorrect mappings.

A substantial amount of developer time is spent in identifying these kinds of semantic ambiguities and resolving them. In conventional systems and methods, much of this interface mapping is done by consultants manually. Analysts and developers typically pour over large spreadsheets or XML documents that describe the interface elements of each application and manually create the mappings between source application parameters and target application parameters. However, this conventional process is tedious and laborious.

SUMMARY OF THE INVENTION

In view of the foregoing and other exemplary problems, drawbacks, and disadvantages of the related art methods and structures, an exemplary feature of the present invention is to provide a system, method, and framework for assessing and refining quality of Web services definitions (i.e., Web Services Definition Language (WSDL) definitions) for improving or enabling automatic discovery and matching thereof, and more particularly, to a method and system for assessing the description of Web services definitions and refining or improving WSDL definitions by providing automated recommendations or suggestions for making Web services descriptions more amenable for consumption by automatic matching and composition engines.

As described above, automatically matching Web services definitions (WSDL definitions) and thereby enabling discovery and composition of Web services is a difficult problem which has not bee addressed or solved by the conventional systems and methods.

Accordingly, the present invention solves the above problems with the conventional methods and systems by providing, for example, recommendations to the authors of Web services such that the descriptions can be refined or improved to be more amenable to automation (i.e., consumption by automatic matching and composition engines).

It is noted that, interface descriptions of Web services are often terse and cryptic (e.g., 'CDE' for 'code', 'STRTDT' for 'START_DATE'). Also, vocabulary may not be controlled or standardized (e.g., EAN Codes, UPC Codes). Further, matching can involve resolving syntactic, semantic and structural differences in interfaces.

It is also noted that the conventional tools available generally require substantial user input. For example, conventional database schema matching generally uses domain-independent dictionaries, and some domain-specific ontologies. On the other hand, Web Services Matching generally uses exact matching of services. Others use domain-independent (e.g., WordNet dictionary) and/or domain-specific ontologies (e.g., Retail industry ontology, biology ontology represented in OWL-S, WSMO, WSDL-S)

These conventional approaches rely heavily on subjective decisions and require software designers to have a good understanding of the application domain and the types of systems they expect to build in the future. However, the conventional systems and methods have not addressed the assessment of quality of descriptions of Web services from the point of view of application integration and also do not provide specific recommendations to improve the descriptions to make them more friendlier or amenable for consumption by automation engines.

To solve the problems with the conventional art, the present invention provides a method and a system to assess the quality of Web services definitions (WSDLs) and to recommend ways of improving the WSDL definitions so as to make them so as to make them more amenable for consumption by automatic matching and composition engines.

The present invention provides important advantages of providing recommendations for improving WSDL interface definitions in a user friendly manner rather than just pointing out that certain names are ambiguous without any suggestions. According to the present invention, suggested refinements, when accepted, can be used to make Web services more amenable for automatic discovery and matching, thereby improving the productivity of information technology (IT) consultants in integration projects, which provides cost savings and reduced project durations.

For example, an exemplary aspect of the invention provides a system for assessing and refining quality of Web services definitions (WSDLs) for improving or enabling automatic discovery and matching thereof, which includes a recommendation generator module that generates recommendations for changing at least one Web services definition (WSDL) element based on available Web service definitions (WSDLs), thereby improving or enabling automatic discovery and matching of the at least one Web services definition (WSDL) element.

In another exemplary aspect of the invention, a method of assessing and refining quality of Web services definitions (WSDLs) for enabling automatic discovery and matching thereof, including automatically generating recommendations for changing at least one Web services definition (WSDL) element based on available Web service definitions (WSDLs).

In another exemplary aspect of the invention, a system for assessing and refining quality of Web services definitions (WSDLs) for enabling automatic discovery and matching thereof, including means for normalizing Web services definition (WSDL) elements and identifying at least one Web services definition (WSDL) element as being at least one of cryptic, ambiguous, and unclear, and providing a normalization output, means for assessing a quality of the at least one Web service definition (WSDL) element based on the normalization output, classifying the identified at least one Web services definition (WSDL) element into at least one predetermined category, and providing a quality assessment output, and means for automatically generating recommendations for changing at least one Web services definition (WSDL) element based on at least one of the normalization output and the quality assessment output, thereby improving or enabling automatic discovery and matching thereof.

In yet another exemplary aspect of the invention, a computer-readable medium tangibly embodying a program of recordable, machine-readable instructions executable by a digital processing apparatus to perform of a method of assessing and refining quality of Web services definitions (WSDLs) for enabling automatic discovery and matching thereof.

BRIEF DESCRIPTION OF THE DRAWINGS

The foregoing and other exemplary purposes, aspects and advantages will be better understood from the following detailed description of an exemplary aspects of the invention with reference to the drawings, in which.

DETAILED DESCRIPTION OF EXEMPLARY ASPECTS OF THE INVENTION

Figure 1:
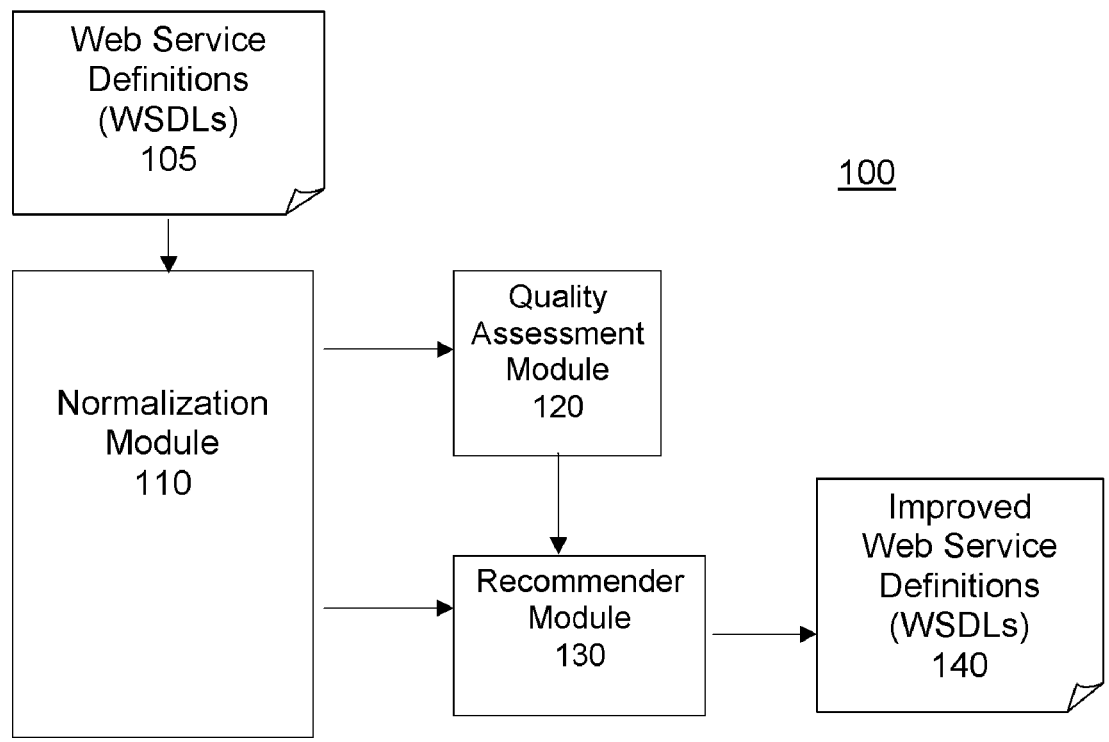
FIG. 1 illustrates a component view of a system according to an exemplary, non-limiting aspect of the present invention.

Referring now to the drawings, and more particularly to FIGS. 1-6, there are shown exemplary aspects of the method and structures according to the present invention.

The present invention relates to a method and system for assessing and refining quality of Web services definitions (i.e., Web Services Definition Language (WSDL) definitions) for improving or enabling automatic discovery and matching thereof, and more particularly, to a method and system for assessing the description of Web services definitions and refining or improving WSDL definitions by providing automated recommendations or suggestions for making Web services descriptions more amenable for consumption by automatic matching and composition engines.

As described above, automatically matching Web services definitions (WSDLs) and thereby enabling discovery and composition of Web services is a difficult problem which has not bee addressed or solved by the conventional systems and methods.

Accordingly, the present invention solves the above problems with the conventional methods and systems by providing, for example, recommendations to the authors of Web services such that the descriptions can be refined or improved to be more amenable to automation (i.e., consumption by automatic matching and composition engines).

A novel and unobvious system and method of assessing the quality of Web services definitions (WSDLs) recommending ways of improving the WSDL definitions so as to make them more amenable to automatic matching and composition is described below with reference to FIGS. 1-6.

For example, with reference to FIG. 1, an exemplary system 100 according the present invention can include, among other things, a Web service definition normalization module 110 that helps identify those elements in WSDL definitions 105 that are either cryptic or ambiguous or unclear.

The exemplary system also can include a Web service definition quality assessment module 120 that can assess the quality of WSDL definitions (based on the results of normalization module 110) and can classify the elements according to preexisting (i.e. predetermined) categories/patterns.

The exemplary system also can include a Web service definition recommendation generator module 130 that can generate suggestions for changing the WSDL definitions based on various heuristics. For example, the Web service definition recommendation generator module 130 can generate suggestions for changing the WSDL definitions based on an output from the normalization module 110 and/or the output from the quality assessment module 120.

Accordingly, the recommender module 130 according to the present invention can provide improved Web service definitions (WSDLs) 140 that are more amenable for consumption by automatic matching and composition engines.

Accordingly, the present invention has an important advantage of providing recommendations for improving WSDL interface definitions in a user friendly manner rather than just pointing out that certain names are ambiguous without any suggestions. Moreover, suggested refinements and improvements according to the present invention, when accepted by the user, can make Web services more amenable for automatic discovery and matching, thereby improving of information technology (IT) consultants in integration projects, providing cost savings, and reducing project durations.

An exemplary aspect of the present invention will be described in greater detail below, with reference to FIG. 2.

The present invention can provide a system 200 that can assess the quality of Web services definitions (WSDLs) and can recommend ways of improving the WSDL definitions such that the Web services definitions can be refined or improved to be more amenable for consumption by automatic matching and composition engines.

The system 200 can make use of domain-independent and domain-specific dictionaries/ontologies to assess the quality and to suggest recommendations for improving WSDL descriptions.

Figure 2:
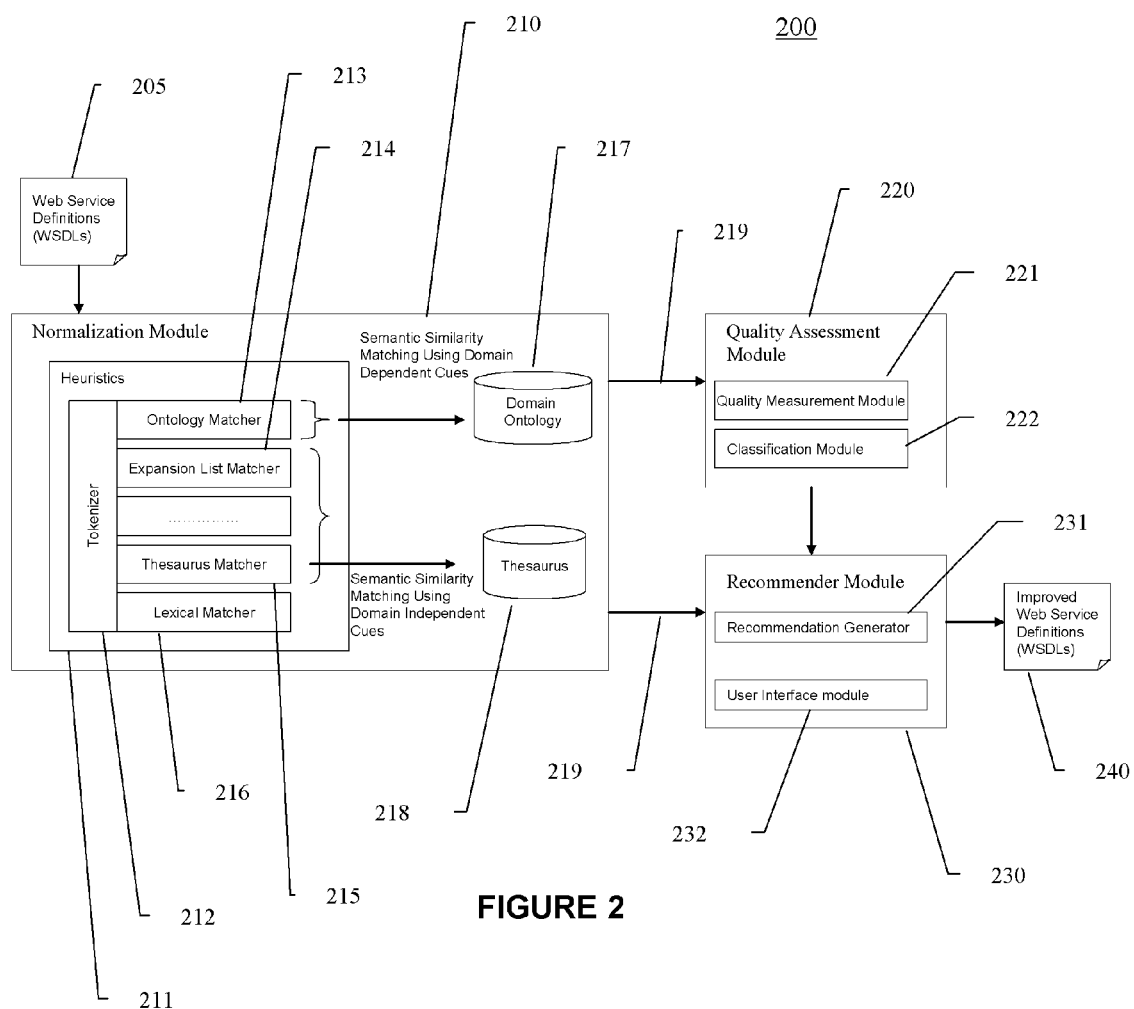
FIG. 2 illustrates another component view of a system according to an exemplary, non-limiting aspect of the present invention.

For example, the system 200, as exemplarily illustrated in FIG. 2, can include a Web service definition normalization module 210 that receives Web service definitions (WSDLs) 205.

First, the normalization module 210 can parse the given WSDL definitions 205 and extracts the names of various elements (e.g., messages, types, interfaces, operations, services, bindings, etc.) and parse them via linguistic normalization procedures.

These linguistic normalization procedures can utilize heuristics, such as tokenization (e.g., parsing words into tokens based on punctuation, case, etc.), abbreviation expansion (e.g., identifying abbreviations, acronyms, etc.), stop word elimination (e.g., discarding prepositions, articles, etc.) and/or root word analysis (e.g., "check vs. checking vs. checked").

Other normalization techniques such as checking for the existence of the word in existing dictionaries (e.g., domain-specific dictionaries, domain-independent dictionaries, etc.) also can be performed.

For example, a client's request and a service provider's service can be modeled as Web services. These Web services can be optionally semantically annotated with contextual information. A semantic matching engine can use domain-independent and domain-specific ontologies to determine the semantic similarity between ambiguous concepts/terms in a WSDL document. The domain-independent relationships can be derived, for example, using an English thesaurus after tokenization, part-of-speech tagging and abbreviation expansion. The domain-specific ontological similarity can be derived, for example, by inferring the semantic annotations associated with Web service descriptions using an ontology. Matches due to the two cues can be combined to determine an overall similarity score.

The following is an overview of some of the exemplary components of a semantic matching engine which can be used to perform normalization procedures for matching the interfaces of a hypothetical Application A and Application B, according to the present invention:

Lexical Matching (L): Words can be matched for their exact lexical similarity. Eg: 'country_cd' on one side matches with 'COUNTRY_CD' on the other side.

Word Tokenization (T): Words can be tokenized based on the common naming conventions used by programmers such as underscore, spaces, camel case letters, etc. For example, the "BillingCode" can be tokenized into two tokens "Billing" and "Code", respectively. This allows for semantic matching of the attributes.

Abbreviation expansion (X): The abbreviation expansion can use domain-independent as well as domain-specific vocabularies. It is possible to have multiple expansions for a candidate words. All such words can be retained for later processing. Thus, a word such as "CustPurch" can be expanded into CustomerPurchase, CustomaryPurchase, etc.

Using domain-independent ontologies (D): A dictionary/thesaurus can be used to find matching synonyms and other related concepts to words. For example, the term FINISH in the multi-part word DATE_FINISH is a synonym to the term END in END_DATE.

Using domain-specific ontologies (O): Domain-specific ontologies can be created by an expert to provide additional contextual information to interface parameters. For example, an expert can create an ontology relating the corresponding terms given in table 1 and annotate the parameters of the interfaces accordingly. These annotations can help in making matches that could not otherwise have been made.

At a high-level, the exemplary semantic matcher can operate as follows. The domain independent reasoning module can take the multi-term words of a given Web service interface and parse them into tokens. Abbreviation expansion can be done for the retained words if necessary, and then a thesaurus can be used to find the similarity of the tokens based on synonyms. The resulting synonyms can be assembled back to determine matches to candidate multi-term word parameters from another Web service interface that it is being matched with (whose parameters also can be treated using the same approach).

Scoring can be done as follows in the case of domain independent reasoner. The semantic similarity between parameters $p_{Ai}$ and $p_{Bj}$ (that belong to Application A and B respectively) consisting of tokens m and n respectively, where k tokens are matched can be given by: Score $(p_{Ai}, p_{Bj})$=Min{(k/m), (k/n)}.

For example, the semantic similarity score between the parameters "Control_Country_CD" (say $p_{Ai}$) and "Country_CD" (say $p_{Bj}$) would be 0.67. This is so because two of the three tokens in $p_{Ai}$ match with the two of the two tokens in $p_j$. Therefore, Score $(p_{Ai}, p_{Bj})$=Min{(2/3), (2/2)}.

If the parameters $p_{Ai}$, $p_{Bj}$ have semantic annotations from a domain ontology, then the reasoner can compute the similarity score, for example, as follows. Relationships subClassOf $(p_{Ai}, p_{Bj})$, subClassOf$(p_{Bj}, p_{Ai})$, and typeOf $(p_{Ai}, p_{Bj})$ all can be given a score of 0.5, sameAs$(p_{Ai}, p_{Bj})$ can be given a score of 1 and no relationship can be given a score of 0.

For example, if both ""Control_Country_CD" and "Country_CD" had the same semantic annotation say 'domainOntology#CountryCode', then they would match exactly and get a score of 1 according to the domain reasoner. In cases where a score can be computed from domain-independent reasoner as well as from a domain-specific reasoner, a winner-take-all approach can be used. It is noted that the system is not limited to the "winner-take-all approach", and the system can implement other schemes for score combination as well. Therefore, the parameters "Control_Country_CD" and "Country_CD" would match with a score of 1.

The ordinarily skilled artisan would recognize that the invention is not limited to the exemplary components described above, and instead, can include other component for semantic matching which would be known and understood by the ordinarily skilled artisan.

With reference again to FIG. 2, the normalization module 210 according to the present invention can include, for example, a first parsing unit that parses the available Web service definitions (WSDLs), an extracting unit that extracts names of a plurality of Web services definition (WSDL) elements, and a second parsing unit that parses the plurality of Web services definition (WSDL) elements based on an output of the at least one linguistic normalization unit.

The normalization module 210 can identify one or more Web services definition (WSDL) elements as being cryptic, ambiguous, unclear, etc., and provide a normalization output 219 to at least one of the quality assessment module 220 and the recommendation generator module 230.

As exemplarily illustrated in FIG. 2, the normalization module 210 can include, for example, a linguistic normalization unit including at least one of a tokenizer 212, an ontology matcher 213, an abbreviation expansion list matcher 214, a thesaurus matcher 215, and a lexical matcher 216.

The normalization module 210 can include, for example, a stop word eliminator, a root word analyzer (not labeled). The normalization module 210 can perform semantic similarity matching using domain-dependent cues based, for example, on domain ontology (e.g., 217), and semantic similarity matching using domain-independent cues based on, for example, a thesaurus (e.g., 218).

The results of this analysis can be sent to the quality assessment module 220 and the recommender module 230.

As illustrated in FIG. 2, the quality assessment module 220 can include a quality measurement module 221 and a classification module 232.

The quality assessment module 220 can take note of the elements that have failed to pass the normalization process and classify them under various categories (e.g., predetermined categories, such as missing expansions, missing word separators, word not found in existing dictionaries, etc). The quality assessment module 220 also can define specific (e.g., predetermined) metrics for measuring the quality of WSDL definitions from the point of view of ease of consumability (i.e., by automatic matching and composition engines).

The results of the analysis from the quality assessment module 220 can be passed to the recommendation generator module 230.

The recommendation generator module 230 can generate suggestions or recommendations, for example, in a recommendation generator 231, for changing the WSDL definitions based on various (e.g., a plurality of) heuristics and can present the suggestions to a user, for example, via a user interface module 232).

The user can then select one of the recommendations for refining and improving the Web service definition element, and thereby providing improved Web service definitions (WSDLs) 240. It is noted that the improved Web service definitions (WSDLs) 240 then can be used in place of the web services definitions 205, as the input into the normalization module 210. Thus, the system can further improve the ease of consumability (i.e., by automatic matching and composition engines) of the improved Web service definitions (WSDLs) 240.

Accordingly, the present invention has an important advantage of providing recommendations for improving WSDL interface definitions in a user friendly manner rather than just pointing out that certain names are ambiguous without any suggestions. Moreover, suggested refinements and improvements according to the present invention, when accepted by the user, can make Web services more amenable for automatic discovery and matching, thereby improving of information technology (IT) consultants in integration projects, providing cost savings, and reducing project durations.

The following exemplarily illustrates a method for service definition assessment and refinement, according to the present invention.

According to the present invention, the provider can name a parameter in a Web service, for example using multiple-words. However, the provider may not use any explicit word separation character (e.g., 'PURCHASEORDER'). Hence, when such parameters are parsed, the system and method according to the present invention can provide an important advantage of recommending that the user use a word separation character, such as a dash or an underscore, or even suggest the use of camelCase letters. For example, the suggestions could be: 'PURCHASE_ORDER' or 'PURCHASE-ORDER' or 'PurchaseOrder' etc.

Another word separations example may be 'STRTDT'→'STRT_DT'. In this example, the suggestions could be, for example: 'START_DATE' or 'START-DATE' or 'StartDate' etc.

Another word separations example may be 'CSTID'→'CST_ID'. In this example, the suggestions could be, for example: 'CUSTOMER_ID' OR 'CUSTOMER_IDENTIFIER' or 'CUSTOMER-ID' or 'CUSTOMER-IDENTIFIER' or 'CustomerId' or 'CustomerIdentifier' etc.

In yet another example, a provider may name the parameter "UID", but provide no expansion for it. When such a parameter is parsed, the system and method according to the present invention can recommend or suggest that the user either enter an expansion, or ask the user to clarify whether the user meant or intended a 'Universal Identifier'.

The following are additional examples of abbreviation expansions. For example, a provider may name the parameter 'CST'. In this example, the suggestions could be, for example, 'CST'→'CUSTOMER'.

The following are additional examples of abbreviation expansions. For example, a provider may name the parameter 'STRT'. In this example, the suggestions could be, for example, 'STRT'→'START'.

The following are additional examples of abbreviation expansions. For example, a provider may name the parameter 'DT'. In this example, the suggestions could be, for example, 'DT'→'DATE'.

Example of annotations include, for example:
'UPC'→'subClassOf EANCode'
'Coup'→'subClassOf Car'.

The system and method according to the present invention can obtain the expansion for suggestion from various sources including, for example, domain-independent dictionaries, domain-specific dictionaries, and other sources to which access can be provided.

Thus, the system and method according to the present invention can provide important advantages over the conventional methods and systems, which do not, among other things, provide recommendations or assess the quality of the Web service definition elements.

For example, the system and method according to the present invention can assist or help a user to refine the descriptions of the Web services that they write in order to make these Web services more amenable for automatic discovery and matching (e.g., by automatic matching and composition engines), which can improve the productivity of Information Technology (IT) consultants in implementing business application integration projects. These productivities can be translated into cost savings and reduced project durations.

The inventors of the present application has recognized that any system that does not add value or does not demonstrably prove its usefulness likely will not be adopted. Hence, the present invention has an important advantage of using information retrieval and semantic Web techniques and various other heuristics to provide recommendations for improving the WSDL interface definitions in a user friendly manner, rather than just pointing out that certain names are ambiguous without any suggestions.

Figure 3:
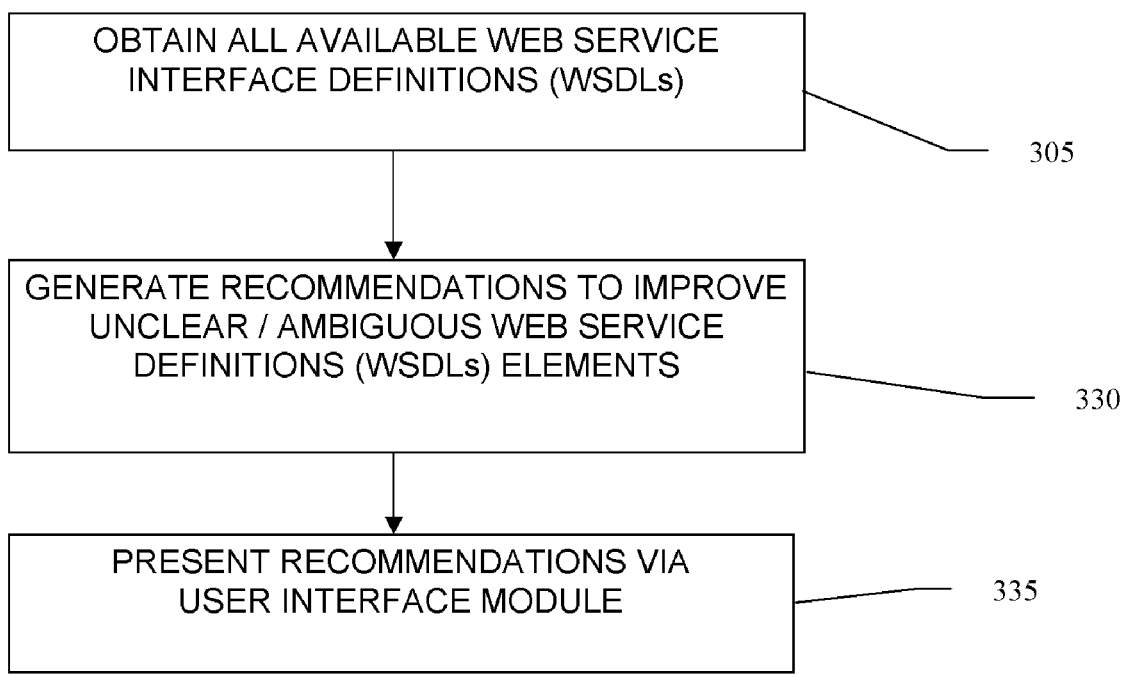
FIG. 3 illustrates another exemplary method, according to an exemplary, non-limiting aspect of the present invention.
Figure 4:
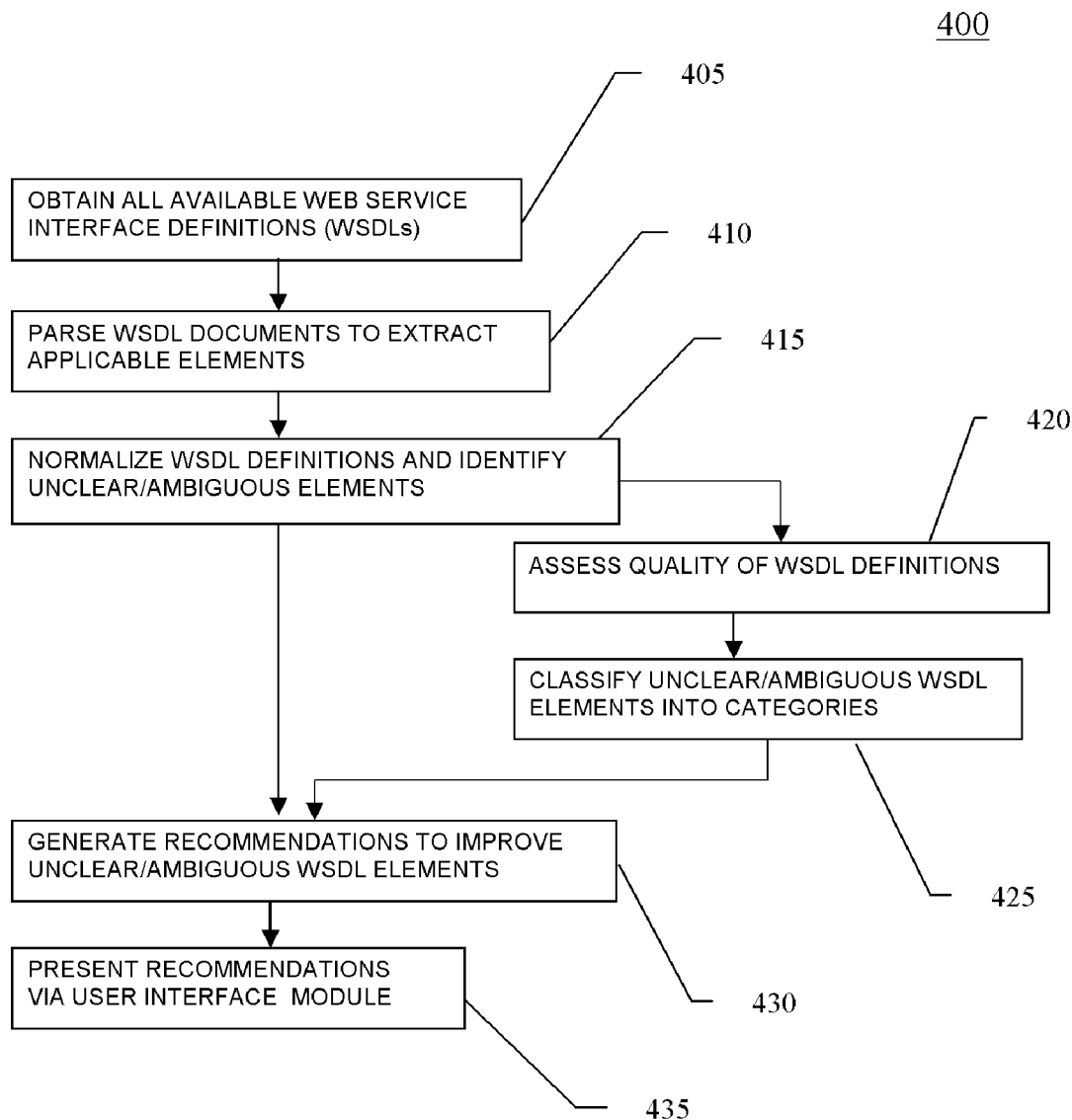
FIG. 4 illustrates an exemplary method, according to an exemplary, non-limiting aspect of the present invention.

With reference to FIGS. 3 and 4, an exemplary method according to the present invention will be described.

With reference to FIG. 3, one exemplary aspect of a method 300 according to the present invention can include automatically generating (e.g., see step 330) recommendations for changing at least one Web services definition (WSDL) element based on available Web service definitions (WSDLs) (e.g., see step 305) and present or display the recommendation to a user via a user interface module (e.g., see step 335).

More particularly, with reference to FIG. 4, an exemplary aspect of a method 400 according to the present invention can include obtaining available (e.g., all available) Web service definitions (e.g., Web service interface definitions) (WSDLs) (see step 405), parsing the Web service definitions documents to extract application elements (see step 410), and normalizing the Web service definitions and identifying unclear/ambiguous elements (see step 415).

A normalization output can be used to assess the quality of the Web service definitions (see step 420) and classify the unclear/ambiguous Web service definition elements into predetermined categories (see step 425).

As illustrated in FIG. 4, the normalized output from step 415 and the quality assessment output from steps 420 and 425 can be used to generate recommendation or suggestions to improve the unclear/ambiguous Web service definition elements (see step 430). The recommendations can be presented to a user via a user interface module (see step 435), such that the user can select one of the recommendations, thereby improving the WSDL interface definitions in a user friendly manner to improve consumability and automated matching (e.g., by automatic matching and composition engines).

Hence, the method 400 illustrated in FIG. 4 can provide an important advantage of automatically generating (e.g., see step 330) recommendations for changing at least one Web services definition (WSDL) element based on available Web service definitions (WSDLs) (e.g., see step 305) and presenting or displaying the recommendation to a user via a user interface module (e.g., see step 335).

The exemplary aspects of the present invention also can use the obtained improved Web services definitions (WSDLs) (e.g., 140, 240) based on the user's selection of one of the recommendations, in place of Web services definitions (WSDLs) (e.g., 105, 205), as exemplarily illustrated in FIGS. 1 and 2.

Another exemplary aspect of the present invention is directed to a computer-readable medium tangibly embodying a program of recordable, machine-readable instructions executable by a digital processing apparatus for perform the exemplary methods described above.

Another exemplary aspect of the present invention is directed to a system for assessing and refining quality of Web services definitions (WSDLs) for enabling automatic discovery and matching thereof, which includes means for normalizing Web services definition (WSDL) elements and identifying at least one Web services definition (WSDL) element as being at least one of cryptic, ambiguous, and unclear, and providing a normalization output (e.g., see 110, 210), means for assessing a quality of the at least one Web service definition (WSDL) element based on the normalization output, classifying the identified at least one Web services definition (WSDL) element into at least one predetermined category, and providing a quality assessment output (e.g., see 120, 220) and means for automatically generating recommendations for changing at least one Web services definition (WSDL) element based on at least one of the normalization output and the quality assessment output, thereby improving or enabling automatic discovery and matching thereof (e.g., see 130, 230).

Figures 5, 6:
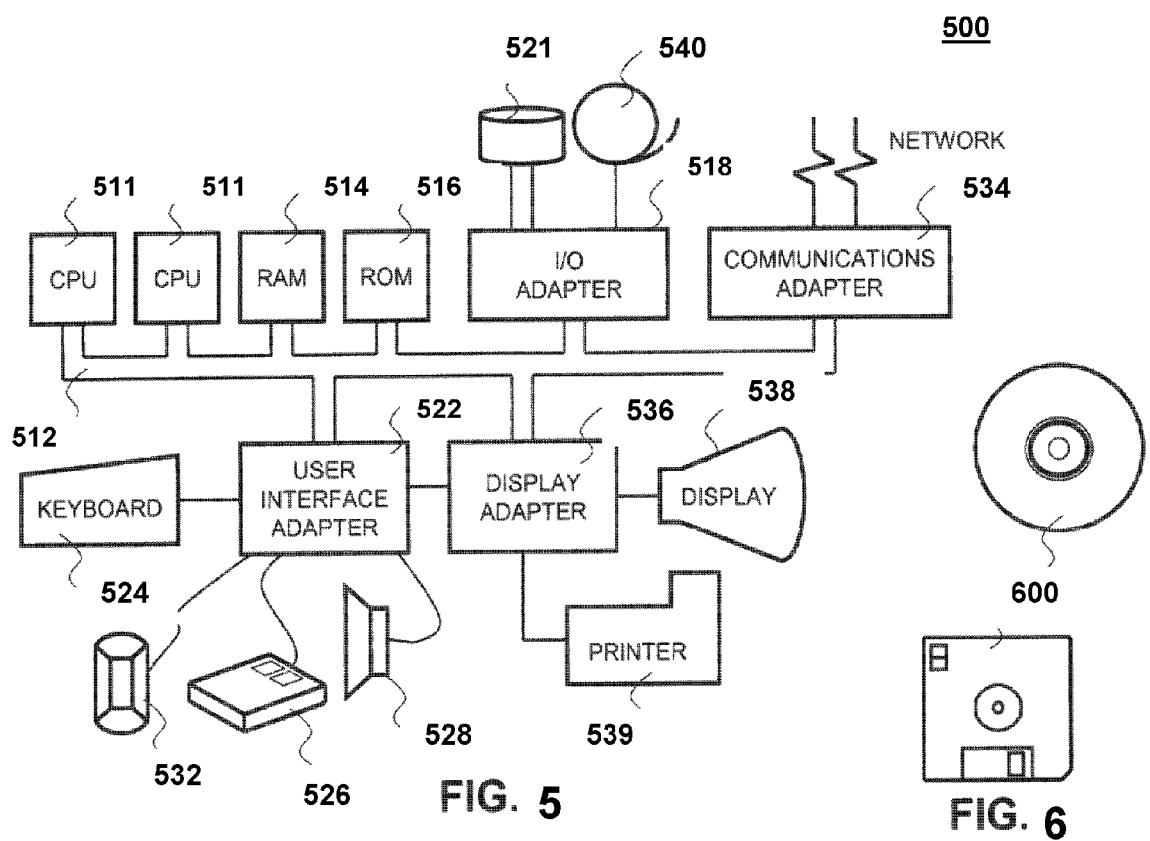
FIG. 5 illustrates an exemplary hardware/information handling system 500 for incorporating the present invention therein.
FIG. 6 illustrates a computer-readable medium (e.g., storage medium 600) for storing/recording steps of a program of a method according to the present invention.

FIG. 5 illustrates an exemplary hardware/information handling system 500 for incorporating the present invention therein, and FIG. 6 illustrates a computer-readable medium 600 (e.g., signal-bearing medium, storage medium, etc.) for storing steps of a program of a method according to the present invention.

FIG. 5 illustrates a typical hardware configuration of an information handling/computer system for use with the invention and which preferably has at least one processor or central processing unit (CPU) 511.

The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, an Intranet, a personal area network (PAN), etc., and a display adapter 536 for connecting the bus 512 to a display device 538 and/or printer 539.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This computer-readable media or signal-bearing media may include, for example, a RAM contained within the CPU 511, as represented by the fast-access storage for example. Alternatively, the instructions may be contained in another computer-readable media or signal-bearing media, such as a data storage disk/diskette 600 (FIG. 6), directly or indirectly accessible by the CPU 511.

Whether contained in the disk/diskette 600, the computer/CPU 511, or elsewhere, the instructions may be stored on a variety of machine-readable (computer-readable) data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable computer-readable media or signal-bearing media including transmission media such as digital and analog and communication links and wireless. In an illustrative embodiment of the invention, the machine-readable instructions may comprise software object code, compiled from a language such as "C", etc.

While the invention has been described in terms of several exemplary aspects, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A system for assessing and refining a quality of Web services description language (WSDL) definitions, the system comprising:
   a processor;
   a module for assessing a quality of at least one Web service definition (WSDL) element, as executed by the processor, prior to automatically generating recommendation based on a normalization output for the at least one Web service definition (WSDL) element;
   a module for classifying the at least one Web service definition (WSDL) element, as executed by the processor, according to at least one of a plurality of predetermined categories and patterns;
   a recommendation generator module, as executed by the processor, that generates a recommendation for changing the at least one Web services definition (WSDL) element based on available Web service definitions (WSDLs);
   a module for providing quality assessment output, as executed by the processor, for said automatically generating said recommendation;

a quality assessment module, as executed by the processor, that assesses a quality of the at least one Web service definition (WSDL) element and provides a quality assessment output to the recommendation generator module;

a normalization module, as executed by the processor, that identifies the at least one Web services definition (WSDL) element as being at least one of cryptic, ambiguous, and unclear, and provides a normalization output to at least one of the quality assessment module and the recommendation generator module, wherein the recommendation generator receives the quality assessment output from either of the quality assessment module and the normalization output from the normalization module, and generates recommendation for changing the at least one Web services definition (WSDL) element based on the quality assessment output or the normalization output.

2. The system according to claim 1, wherein the recommendation generator module comprises:

a recommendation generator, as executed by the processor, that receives the quality assessment output from the quality assessment module and generates the recommendation for changing the at least one Web services definition (WSDL) element, and a user interface module, as executed by the processor, that displays the recommendation to a user via a display device.

3. The system according to claim 1, wherein the normalization module comprises: a first parsing unit, as executed by the processor, that parses available Web service definitions (WSDLs); an extracting unit, as executed by the processor, that extracts names of a plurality of Web services definition (WSDL) elements; and a second parsing unit, as executed by the processor, that parses the plurality of Web services definition (WSDL) elements based on an output of the normalization module.

4. The system according to claim 1, wherein the normalization module comprises at least one linguistic normalization unit, as executed by the processor, comprising at least one of a tokenizer, an ontology matcher, an abbreviation expansion list matcher, a thesaurus matcher, a lexical matcher, a stop word eliminator, a root word analyzer, a domain-dependent semantic similarity matching unit, and a domain-independent semantic similarity matching unit, each of said tokenizer, ontology matcher, abbreviation expansion list matcher, thesaurus matcher, lexical matcher, stop word eliminator, root word analyzer, domain-dependent semantic similarity matching unit, and domain-independent semantic similarity matching unit being executed by the processor, respectively.

5. The system according to claim 1, wherein said Web service definition quality assessment module assesses the quality of the at least one of the Web service definition (WSDL) element based on the normalization output of the normalization module, and classifies the at least one of the Web service definition (WSDL) element according to at least one of a plurality of predetermined categories and patterns.

6. The system according to claim 1, wherein the quality assessment module defines specific metrics for measuring quality of the at least one Web services definition (WSDL) element.

7. A method of assessing and refining a quality of Web services definitions (WSDLs) for enabling automatic discovery and matching thereof, said method being controlled by a processor, the method comprising:

automatically generating a recommendation for changing at least one Web services definition (WSDL) element based on available Web service definitions (WSDLs);

assessing a quality of the at least one Web service definition (WSDL) element, as executed by the processor, prior to said automatically generating said recommendation based on a normalization output for the at least one Web service definition (WSDL) element;

classifying the at least one of the Web service definition (WSDL) element, as executed by the processor, according to the at least one of a plurality of predetermined categories and patterns; and providing quality assessment output, as executed by the processor, for said automatically generating said recommendation;

identifying the at least one Web services definition (WSDL) element, as executed by the processor, as being at least one of a cryptic, ambiguous, and unclear quality; and performing at least one linguistic normalization process, as executed by the processor, on the at least one Web services definition (WSDL) element prior to said automatically generating said recommendation to provide the normalization output for at least one of said assessing the quality and said automatically generating said recommendation;

wherein the recommendation generator receives the quality assessment output from either of the quality assessment module and the normalization output from the normalization module, and generates the recommendation for changing the at least one Web services definition (WSDL) element based on the quality assessment output or the normalization output.

8. The method according to claim 7, wherein said automatically generating said recommendation for changing the at least one Web services definition (WSDL) element is further based on a quality assessment output, said method further comprising displaying said recommendation to a user via a user interface module.

9. The method according to claim 7, wherein said automatically generating said recommendation for changing the at least one Web services definition (WSDL) element is further based on the quality assessment output and the normalization output, said method further comprising displaying said recommendation, as executed by the processor, to a user via a user interface module.

10. The method according to claim 7, said method further comprising defining at least one metric for measuring a quality of the at least one Web services definition (WSDL) element.

11. A system for assessing and refining a quality of Web services definitions (WSDLs) for enabling automatic discovery and matching thereof, the system comprising:

a processor; a memory;

means for assessing a quality of at least one Web service definition (WSDL) element, as executed by the processor, prior to automatically generating recommendation based on a normalization output for the at least one Web service definition (WSDL) element;

means for classifying the at least one Web service definition (WSDL) element, as executed by the processor, according to at least one of a plurality of predetermined categories and patterns; and means for normalizing Web services definition (WSDL) elements, being executed by the processor, and identifying the at least one Web services definition (WSDL)

element as being at least one of cryptic, ambiguous, and unclear, and providing a normalization output;

means for assessing a quality of the at least one Web service definition (WSDL) element, as executed by the processor, based on the normalization output, classifying the identified at least one Web services definition (WSDL) element into at least one predetermined category, and providing a quality assessment output; and means for automatically generating a recommendation, as executed by the processor, for changing the at least one Web services definition (WSDL) element based on at least one of the normalization output and the quality assessment output.

12. The method according to claim 7, further comprising outputting, as executed by the processor, revised Web services definitions (WSDLs) based on a user's selection of the recommendation.

13. The method according to claim 12, further comprising performing automatic discovery and matching, as executed by the processor, based on the revised Web services definitions (WSDLs).

14. An apparatus for assessing and refining a quality of Web services description language (WSDL) definitions, the apparatus comprising:

a processor; a memory;

a module for assessing a quality of at least one Web service definition (WSDL) element, as executed by the processor, prior to automatically generating recommendation based on a normalization output for the at least one Web service definition (WSDL) element;

a module for classifying the at least one Web service definition (WSDL) element, as executed by the processor, according to at least one of a plurality of predetermined categories and patterns;

a recommendation generator module, as executed by the processor, that generates a recommendation for changing the at least one Web services definition (WSDL) element based on available Web service definitions (WSDLs);

a module for providing quality assessment output, as executed by the processor, for said automatically generating said recommendation;

a quality assessment module, as executed by the processor, that assesses a quality of the at least one Web service definition (WSDL) element and provides a quality assessment output to the recommendation generator module;

a normalization module, as executed by the processor, that identifies the at least one Web services definition (WSDL) element as being at least one of cryptic, ambiguous, and unclear, and provides a normalization output to at least one of the quality assessment module and the recommendation generator module, wherein the recommendation generator receives the quality assessment output from either of the quality assessment module and the normalization output from the normalization module, and generates recommendation for changing the at least one Web services definition (WSDL) element based on the quality assessment output or the normalization output.

15. The apparatus as recited in claim 14, wherein the recommendation generator module comprises:

a recommendation generator, as executed by the processor, that receives the quality assessment output from the quality assessment module and generates the recommendation for changing the at least one WSDL element, and a user interface module, as executed by the processor, that displays the recommendation to a user via a display device.

16. The apparatus as recited in claim 14, further comprising a normalization module, as executed by the processor, configured to parse given WSDL definitions to extract names of respective WSDL elements.

17. The apparatus as recited in claim 16, further comprising a semantic matcher, as executed by the processor, configured to parse multi-term WSDL interface into tokens, wherein said normalization module generates synonyms of the tokens to determine matches to an other multi-term WSDL definition.

* * * * *